United States Patent [19]

Itoh et al.

[11] Patent Number: 4,910,278

[45] Date of Patent: Mar. 20, 1990

[54] MONOMERIC COMPOSITION AND POLYMER THEREFROM

[75] Inventors: Kunio Itoh; Motoo Fukushima, both of Gunma; Harukazu Okuda; Hiroyuki Ohata, both of Fukui, all of Japan

[73] Assignees: Shin-Etsu Chemical Co., Ltd., Tokyo; Nissin Chemical Industry, Co., Ltd., Takefu, both of Japan

[21] Appl. No.: 368,513

[22] Filed: Jun. 20, 1989

[30] Foreign Application Priority Data

Jun. 21, 1988 [JP] Japan ................................. 63-152862

[51] Int. Cl.$^4$ ............................................. C08F 24/00
[52] U.S. Cl. ...................................... 526/273; 526/279
[58] Field of Search ................................. 526/273, 279

[56] References Cited

U.S. PATENT DOCUMENTS 4,414,375  11/1983  Neefe ................................. 526/273

Primary Examiner—Joseph L. Schofer
Assistant Examiner—Alex H. Walker
Attorney, Agent, or Firm—Millen, White & Zelano

[57] ABSTRACT

Rubber vulcanizates having excellent oil resistance, heat resistance and cold resistance can be obtained from a rubbery copolymer which is a polymerization product of an acrylic monomer mixture of which the essential components are an organosiloxy-containing acrylate compound such as acryloxymethyl pentamethyl disiloxane and 3-acryloxypropyl pentamethyl disiloxane and an epoxy group- or halogen-containing monomer such as allyl glycidyl ether, glycidyl methacrylate and vinyl chloroacetate, optionally, with addition of an acrylate ester monomer such as ethyl acrylate, n-butyl acrylate and 2-methoxyethyl acrylate.

10 Claims, No Drawings

MONOMERIC COMPOSITION AND POLYMER THEREFROM

BACKGROUND OF THE INVENTION

The present invention relates to a monomeric composition and a polymer obtained by the polymerization thereof or, more particularly, to a monomeric composition capable of being polymerized into a curable polymer which gives a rubbery elastomer having excellent heat and cold resistance and oil resistance as well as a polymer obtained from the monomeric composition.

So-called acrylic rubbers belong to a class of synthetic rubbers obtained by the copolymerization of an acrylic monomer such as ethyl acrylate, n-butyl acrylate, 2-methoxyethyl acrylate, 2-ethoxyethyl acrylate and the like with a comonomer which gives crosslinking points in the molecules of the copolymer. Acrylic rubbers obtained from ethyl acrylate as the principal comonomer have excellent oil resistance and heat resistance but the cold resistance thereof is poor. Acrylic rubbers obtained from n-butyl acrylate as the principal comonomer have excellent heat and cold resistance but the oil resistance thereof is poor. Further, acrylic rubbers obtained from 2-methoxyethyl or 2-ethoxyethyl acrylate as the principal comonomer have excellent cold resistance and oil resistance but they have rather poor heat resistance. Thus, none of the conventional acrylic rubbers satisfies the requirements for the oil resistance and cold resistance simultaneously.

SUMMARY OF THE INVENTION

The present invention accordingly has an object to provide an acrylic rubber based on an acrylate ester as the principal comonomer and capable of satisfying the above mentioned requirements simultaneously and a monomeric composition which can be polymerized into such a rubber elastomer.

Thus, the monomeric composition of the invention comprises, in admixture:

(a) from 10 to 100 parts by weight of an organosiloxy-containing acrylate ester represented by the general formula

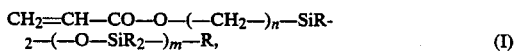
$$CH_2=CH-CO-O-(-CH_2-)_n-SiR_2-(-O-SiR_2-)_m-R, \quad (I)$$

in which each R is, independently from the others, an alkyl group or an alkoxy-substituted alkyl group having 1 to 6 carbon atoms, the subscript n is an integer of 1 to 5 and the subscript m is an integer of 1 to 5;

(b) up to 90 parts by weight of an acrylate ester represented by the general formula

$$CH_2=CH-CO-O-R^1, \quad (II)$$

in which $R^1$ is an alkyl group or alkoxy-substituted alkyl group having 1 to 6 carbon atoms, total amount of the components (a) and (b) being 100 parts by weight;

(c) from 0.1 to 10 parts by weight of an epoxy-containing monomer or a halogen-containing monomer; and (d) up to 5 parts by weight of a radical polymerization initiator.

The above defined monomeric composition can be polymerized by heating, when the composition contains a radical polymerization initiator, or by the irradiation with actinic rays, when the composition contains no radical polymerization initiator, to give a polymer of the invention.

DETAILED DESCRIPTION OF THE PREFERRED EMBODIMENTS

As is described above, the essential components in the inventive monomeric composition are the components (a) and (b). The component (a) is an organosiloxy-containing acrylate ester or an acryloxyalkyl-substituted organopolysiloxane represented by the above given general formula (I), in which R denoted an alkyl group having 1 to 6 carbon atoms including methyl, ethyl, propyl, butyl, pentyl and hexyl groups or an alkyl group having 1 to 6 carbon atoms substituted for a part or all of the hydrogen atoms therein with halogen atoms, cyano groups and the like including chloromethyl, 3,3,3-trifluoropropyl and 2-cyanoethyl groups. The subscripts n and m are each an integer of from 1 to 5. When the value of m is larger than 5, the rubbery polymer obtained by the polymerization of the monomeric composition would be poor in the resistance against certain organic solvents such as gasoline, mineral spirit and the like as a consequence of the increased chain length of the organopolysiloxane having relatively low solvent resistance. Preferably, the value of m is 1 and the group denoted by R is a methyl group. Examples of preferable compounds as the component (a) include 1-acryloxymethyl-1,1,3,3,3-pentamethyl disiloxane, 1-(3-acryloxypropyl)-1,1,3,3,3-pentamethyl disiloxane and the like though not particularly limitative thereto.

The component (b), which is an optional ingredient in the inventive monomeric composition, is an acrylate ester compound represented by the above given general formula (II), in which $R^1$ is an alkyl group having 1 to 6 carbon atoms, e.g., methyl, ethyl, propyl, butyl, pentyl and hexyl groups, or an alkoxyalkyl group having 1 to 6 carbon atoms, e.g., methoxymethyl, ethoxymethyl, 2-ethoxyethyl and 2-propoxyethyl groups. Examples of the acrylate ester compound suitable as the component (b) include methyl acrylate, ethyl acrylate, n-propyl acrylate, isopropyl acrylate, n-butyl acrylate, sec-butyl acrylate, isobutyl acrylate, n-amyl acrylate, methoxymethyl acrylate, ethoxymethyl acrylate, 2-ethoxyethyl acrylate, 2-propoxyethyl acrylate and the like, of which particularly preferable are ethyl acrylate, 2-methoxyethyl acrylate and n-butyl acrylate in respect of the well balanced properties of the rubbery polymer obtained by the polymerization of the monomeric composition as well as good availability as compared with other acrylate esters. Although the component (b) is optional in the inventive monomeric composition, the amount thereof can be as large as 90 parts by weight per 10 parts by weight of the component (a), the total amount of the components (a) and (b) being 100 parts by weight. When the amount of the component (b) relative to the component (a) is larger than the above mentioned upper limit, the rubbery polymer obtained by the polymerization of the monomeric composition cannot satisfy the requirements for the heat resistance, oil resistance and cold resistance simultaneously.

The component (c) is an epoxy group-containing monomer or a halogen-containing monomer which is copolymerized with the above described component (a) or a combination of the components (a) and (b) with an object to introduce crosslinking points into the rubbery polymer. Preferable epoxy group-containing monomers are allyl glycidyl ether and glycidyl methacrylate and preferable halogen-containing monomers are vinyl chloroacetate and chloroethyl vinyl ether though not particularly limitative thereto. The amount of the component (c) in the inventive monomeric composition is in the range from 0.1 to 10 parts by weight or, preferably, from 0.1 to 5 parts by weight per 100 parts by weight of the total amount of the components (a) and (b). When the amount of the component (c) is too small, the number of the crosslinking points in the rubbery polymer is unduly small so that the cured vulcanizate of the rubbery polymer cannot be imparted with full mechanical strengths. When the amount of the component (c) is too large, on the other hand, the crosslinking density in the cured vulcanizate of the rubbery polymer is too large so that the vulcanizate cannot exhibit elongation as a rubbery elastomer.

The component (d) is a radical polymerization initiator to copolymerize the above described components (a) to (c). This component is not essential but optional because the copolymerization of the monomers can take place in some cases by merely heating the mixture of the monomers or by irradiating the mixture of the monomers with actinic rays such as high-energy ionizing radiation or ultraviolet light. When used, the amount of the component (d) in the inventive monomeric composition is up to 5 parts by weight per 100 parts by weight of the total amount of the components (a) and (b).

The type of the polymerization reaction to copolymerize the components (a) to (c) as the comonomers is not particularly limitative including solution polymerization and bulk polymerization. It is, however, preferable that the copolymerization of the comonomers is performed as emulsion polymerization in an aqueous medium containing an emulsifying agent, polymerization initiator, i.e. the component (d), and, if necessary, polymerization regulator, in which the comonomers are dispersed and emulsified. The emulsifying agent used here is not particularly limitative including fatty acid-based soaps, e.g., sodium oleate and sodium palmitate, diethylaminoethyl oleyl amide hydrochloride, cetyl trimethyl ammonium methyl sulfate, laurylamine hydrochloride, sodium laurylsulfate, sodium isopropyl-naphthalene sulfonate and the like. Examples of usable polymerization initiators include benzoyl peroxide, sodium persulfate, hydrogen peroxide, cumene hydroperoxide, diazoaminobenzene and the like, of which those soluble in hydrocarbons are preferred although water-soluble ones also can be used. When hydrogen peroxide is used as the polymerization initiator, it is sometimes advantageous that a reducing agent is used in combination so as to promote the polymerization reaction. When a copolymer of a relatively low degree of polymerization still exhibiting high adhesiveness is desired by the copolymerization including an alkyl acrylate or an alkoxyalkyl acrylate, a polymerization regulator or chain transfer agent is added to the reaction mixture. The chain transfer agent is preferably an organic sulfur compound such as aliphatic mercaptans.

The polymerization reaction of the inventive monomeric composition is performed usually at a temperature in the range from 20° to 80° C. although the polymerization reaction can be performed in a wider range of temperature from −10° C. to +100° C. or even higher. The emulsion polymerization is carried out at a temperature of 20° to 80° C. to give the desired copolymer almost quantitatively within 1 to 15 hours.

The copolymer obtained by the polymerization of the inventive monomeric composition has epoxy groups or halogen-containing functional groups and is vulcanizable with a vulcanizing agent capable of reacting with these crosslinking sites to give a vulcanized rubbery elastomer having excellent oil resistance, heat resistance and cold resistance. It is optional that the polymer is admixed prior to vulcanization with additives such as reinforcing agents, fillers, plasticizers, aging retarders and the like. A preferable reinforcing filler is a finely divided silica powder because the rubber composition is imparted with excellent workability in roll milling and storage stability by virtue of the high affinity between the silica filler and the siloxane-modified acrylic polymer. Examples of the vulcanizing agent, which is effective at elevated temperatures, include sulfur, organic sulfur compounds, salts of fatty acids, triazine compounds, dithiocarbamates, ammonium carboxylates, diamine carbamates, polyamines, combinations of phthalic anhydride and a imidazole compound, combinations of a polybasic carboxylic acid or an anhydride of a polybasic carboxylic acid and a quaternary ammonium compound, quaternary phosphonium compound, guanidine compound, sulfur or organic sulfur compound and the like.

The rubbery polymer obtained by the polymerization of the inventive monomeric composition is curable by heating in the presence of a vulcanizing agent to give a vulcanized rubbery elastomer having excellent oil resistance, heat resistance and cold resistance as well as excellent mechanical properties so that the rubbery polymer of the invention is industrially useful as a material of various sealings, O-rings, gaskets, oil-resistant hoses, sheaths of electric cables and the like.

In the following, the present invention is described in more detail by way of examples, in which the term of "parts" always refers to "parts by weight".

Example 1 and Comparative Examples 1 to 3.

Into a three-necked flask of 500 ml capacity equipped with a stirrer, reflux condenser, thermometer and inlet tube for nitrogen gas were introduced 250 g of deionized water and 3 g of sodium lauryl sulfate and the temperature of the solution in the flask was controlled at 10° C. Thereafter, 0.1 g of tert-butyl hydroperoxide, 0.5 g of L-ascorbic acid and 0.0005 g of iron (II) sulfate heptahydrate were added to the solution under a stream of nitrogen gas and then a mixture of acryloxymethyl pentamethyl disiloxane, referred to as DM-100 hereinbelow, and 1.5 g of vinyl chloroacetate, referred to as VCA hereinbelow, was added to the solution dropwise over a period of 3 hours to effect the copolymerization of these monomers.

After completion of the dropwise addition of the monomer mixture, the mixture in the flask was agitated for additional 1 hour to complete the polymerization reaction. The polymerizate mixture was admixed with a saturated aqueous solution of calcium chloride to effect salting-out of the polymer which was collected by filtration, washed with water and dried to give 98.5 g of dry polymer which had a Mooney viscosity $ML_{1+4}(100°$ C.) of 41 and a glass transition point $T_g$ of −56° C.

In the next place, 100 parts of the thus obtained polymer were uniformly blended on a two-roller mill kept at 65° C. with 50 parts of a finely divided silica filler (Nipsil LP, a product by Nippon Silica Co.), 2 parts of an aging retarder (Nauguard 445, a product by Uniroyal Co.) and 1 part of stearic acid and then, after cooling to room temperature, further with 3 parts of magnesium oxide and 1 part of triazine trithiol (Disnet, a product by Sankyo Kasei Co.) on the two-roller mill. The thus prepared rubber composition was shaped into a sheet which was press-cured at 165° C. for 12 minutes under a pressure of 30 kg/cm² and then post-cured in a hot-air oven at 180° C. for 8 hours. The cured rubber sheet was subjected to the measurements of the mechanical properties as cured, after heating in No. 3 oil at 150° C. for 70 hours to test the oil resistance or after heating in air at 180° C. for 70 hours to test the heat resistance to give the results shown in Table 1 below. Further, the cold resistance of the rubber sheet as cured was measured by the Gehman torsion test to give the result also shown in the same table. These results indicate that the rubber sheet had excellent oil resistance, heat resistance and cold resistance.

For comparison, the same test as above was repeated in Comparative Examples 1, 2 and 3 excepting replacement of the DM-100 with the same amount of ethyl acrylate, n-butyl acrylate or 2-methoxyethyl acrylate, respectively, to give the results shows in Table 1 which also shows the Mooney viscosity and the glass transition point of the respective copolymers.

Examples 2 to 4 and Comparative Example 4.

The experimental procedure in Example 2 was substantially the same as in Example 1 excepting replacement of 98.5 g of DM-100 with a combination of 49.25 g of DM-100 and 49.25 g of ethyl acrylate.

In Example 3, the polymerization of the monomer mixture was performed in the same manner as in Example 1 excepting replacement of 1.5 g of VCA with 2.0 g of allyl glycidyl ether, referred to as AGE hereinbelow, and 100 parts of the copolymer thus obtained was compounded on a two-roller mill at 65° C. with 60 parts of a carbon black (Asahi #60 FEF Black, a product by Asahi Carbon Co.), 2 parts of the same aging retarder as in Example 1 and 1 part of stearic acid and then, after cooling to room temperature, with 2 parts of zinc dimethyl dithiocarbamate on the two-roller mill. Curing schedule of the rubber sheet was the same as in Example 1.

The experimental procedure in Example 4 was substantially the same as in Example 3 above excepting replacement of DM-100 with the same amount of 3-acryloxypropyl pentamethyl disiloxane, referred to as DM-300 hereinbelow.

Further, the experimental procedure in Comparative Example 4 was substantially the same as in Example 3 excepting replacement of the DM-100 with the same amount of trimethylsilylmethyl acrylate, referred to as BM-100 hereinbelow.

The testing procedures of the rubber sheets prepared in these examples and comparative example were the same as in the preceding examples to give the results also shown in Table 1 which also shows the Mooney viscosity and glass transition point of the polymers obtained therein. The results shown in the table indicate that the rubber sheet prepared in Comparative Example 4 has poor cold resistance as compared with Examples 3 and 4 presumably because the BM-100 has no polysiloxane structure.

TABLE 1

|  |  | Example | | | | Comparative Example | | | |
| --- | --- | --- | --- | --- | --- | --- | --- | --- | --- |
|  |  | 1 | 2 | 3 | 4 | 1 | 2 | 3 | 4 |
| Copoly- | Mooney viscosity $ML_{1+4}$ (100° C.) | 41 | 45 | 40 | 41 | 48 | 36 | 40 | 45 |
| mer | Glass transition point, °C. | −56 | −37 | −56 | −66 | −18 | −48 | −36 | −9 |
| As | Hardness, JIS A | 59 | 62 | 70 | 72 | 61 | 60 | 63 | 71 |
| cured | Ultimate elongation, % | 380 | 345 | 335 | 315 | 360 | 290 | 308 | 298 |
|  | Tensile strength, kg/cm² | 111 | 122 | 114 | 112 | 125 | 85 | 95 | 121 |
|  | Tear strength, type A, kg/cm | 33 | 37 | 32 | 30 | 35 | 18 | 21 | 38 |
| Oil | Increment in hardness, point | −9 | — | — | — | −11 | −25 | −8 | — |
| resist- | Increment in ultimate elongation, % | −21 | — | — | — | −23 | −45 | −12 | — |
| ance | Increment in tensile strength, % | −10 | — | — | — | −12 | −38 | −9 | — |
|  | Increment in volume, % | +25 | +21 | +28 | +72 | +15 | +100 | +4 | +18 |
| Heat | Increment in hardness, point | +1 | +1 | +3 | +4 | +3 | +5 | +15 | +1 |
| resist- | Increment in ultimate elongation, % | +7 | +6 | +7 | −1 | +5 | −15 | −48 | +3 |
| ance | Increment in tensile strength, % | +11 | +7 | +5 | −2 | +8 | −5 | −32 | +7 |
|  | Cold resistance, $T_{10}$, °C. | −48 | −29 | −49 | −58 | −11 | −38 | −29 | −5 |

What is claimed is:

1. A monomer composition which comprises, in admixture:
    (a) from 10 to 100 parts by weight of an organosiloxy-containing acrylate ester compound represented by the general formula

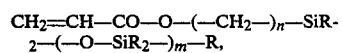
    $$CH_2=CH-CO-O-(-CH_2-)_n-SiR_2-(-O-SiR_2-)_m-R,$$

in which each R is, independently from the others, an alkyl group or alkoxy-substituted alkyl group having 1 to 6 carbon atoms, the subscript n is an integer of 1 to 5 and the subscript m is an integer of 1 to 5;
    (b) up to 90 parts by weight of an acrylate ester compound represented by the general formula

    $$CH_2=CH-COOR^1,$$

in which $R^1$ is an alkyl group or alkoxy-substituted alkyl group having 1 to 6 carbon atoms, total amount of the components (a) and
    (b) being 100 parts by weight;
    (c) from 0.1 to 10 parts by weight of an epoxy group-containing monomer or a halogen-containing monomer; and
    (d) up to 5 parts by weight of a radical polymerization initiator.

2. The monomer composition as claimed in claim 1 wherein the alkyl group denoted by R is a methyl group.

3. The monomer composition as claimed in claim 1 wherein the subscript m is 1.

4. The monomer composition as claimed in claim 1 wherein the subscript n is 1 or 3.

5. The monomer composition as claimed in claim 1 wherein the acrylate ester compound as the component (b) is selected from the group consisting of ethyl acrylate, 2-methoxyethyl acrylate, n-butyl acrylate and 2-ethoxyethyl acrylate.

6. The monomer composition as claimed in claim 1 wherein the epoxy group-containing monomer as the component (c) is allyl glycidyl ether or glycidyl methacrylate.

7. The monomer composition as claimed in claim 1 wherein the halogen-containing monomer as the component (c) is vinyl chloroacetate or 2-chloroethyl vinyl ether.

8. The monomer composition as claimed in claim 1 wherein the amount of the component (c) is in the range from 0.1 to 5 parts by weight per 100 parts by weight of the total amount of the components (a) and (b).

9. The monomer composition as claimed in claim 1 wherein the organosiloxy-containing acrylate ester compound as the component (a) is acryloxymethyl pentamethyl disiloxane or 3-acryloxypropyl pentamethyl disiloxane.

10. A polymer which is a polymerization product of the monomer composition according to claim 1.

* * * * *

UNITED STATES PATENT AND TRADEMARK OFFICE
CERTIFICATE OF CORRECTION

PATENT NO. : 4,910,278

DATED : March 20, 1990

INVENTOR(S) : ITOH ET AL

It is certified that error appears in the above-identified patent and that said Letters Patent is hereby corrected as shown below:

Column 1, formula, lines 45-46:

reads "$CH_2=CH-CO-O-(-CH_2-)n-SiR_2-(-O-SiR_2-)m-R$"

should read -- $CH_2=CH-CO-O-(-CH_2-)n-SiR_2--(-O-SiR_2-)m-R$ --

Column 6, claim 1, lines 37-38:

reads "$CH_2=CH-CO-O-(-CH_2-)n-SiR_2-(-O-SiR_2-)m-R$"

should read -- $CH_2=CH-CO-O-(-CH_2-)n-SiR_2--(-O-SiR_2-)m-R$ --

Signed and Sealed this

Eleventh Day of December, 1990

Attest:

HARRY F. MANBECK, JR.

Attesting Officer

Commissioner of Patents and Trademarks